United States Patent [19]
Van Hulle

[11] 4,329,675
[45] May 11, 1982

[54] SYSTEM FOR AUTOMATICALLY SUBSTITUTING TELEVISION SIGNALS AT A HEAD STATION FOR A CABLE NETWORK

[75] Inventor: Erick Van Hulle, Waterloo, Belgium

[73] Assignee: Societe Anonyme dite: Visiodis, Aubervilliers, France

[21] Appl. No.: 192,117

[22] Filed: Sep. 23, 1980

[30] Foreign Application Priority Data

Jul. 18, 1980 [FR] France ............................ 80 15910

[51] Int. Cl.³ ...................... H04N 5/22; H04N 7/10
[52] U.S. Cl. .................................. 358/86; 358/153; 358/181; 358/185
[58] Field of Search ............... 358/86, 153, 181, 185

[56] References Cited
U.S. PATENT DOCUMENTS 3,702,898  11/1972  Webb ................................. 358/181

Primary Examiner—Robert L. Richardson
Assistant Examiner—Edward L. Coles
Attorney, Agent, or Firm—Sughrue, Mion, Zinn, Macpeak and Seas

[57] ABSTRACT

A system for automatically substituting television signals from different sources at a station for applying signals to a cable TV network. The substitution system (10) includes at least one switch (9) inserted between the cable network and the outputs of at least one signal processing equipment (1,4) and of at least one signal generating equipment (6) which feed the network, as well as at least one synchronizing signal detector (8) connected to a processing equipment output and suitable for controlling the switch associated with said processing equipment to control making and breaking of the link between the processing equipment and the network.

2 Claims, 1 Drawing Figure

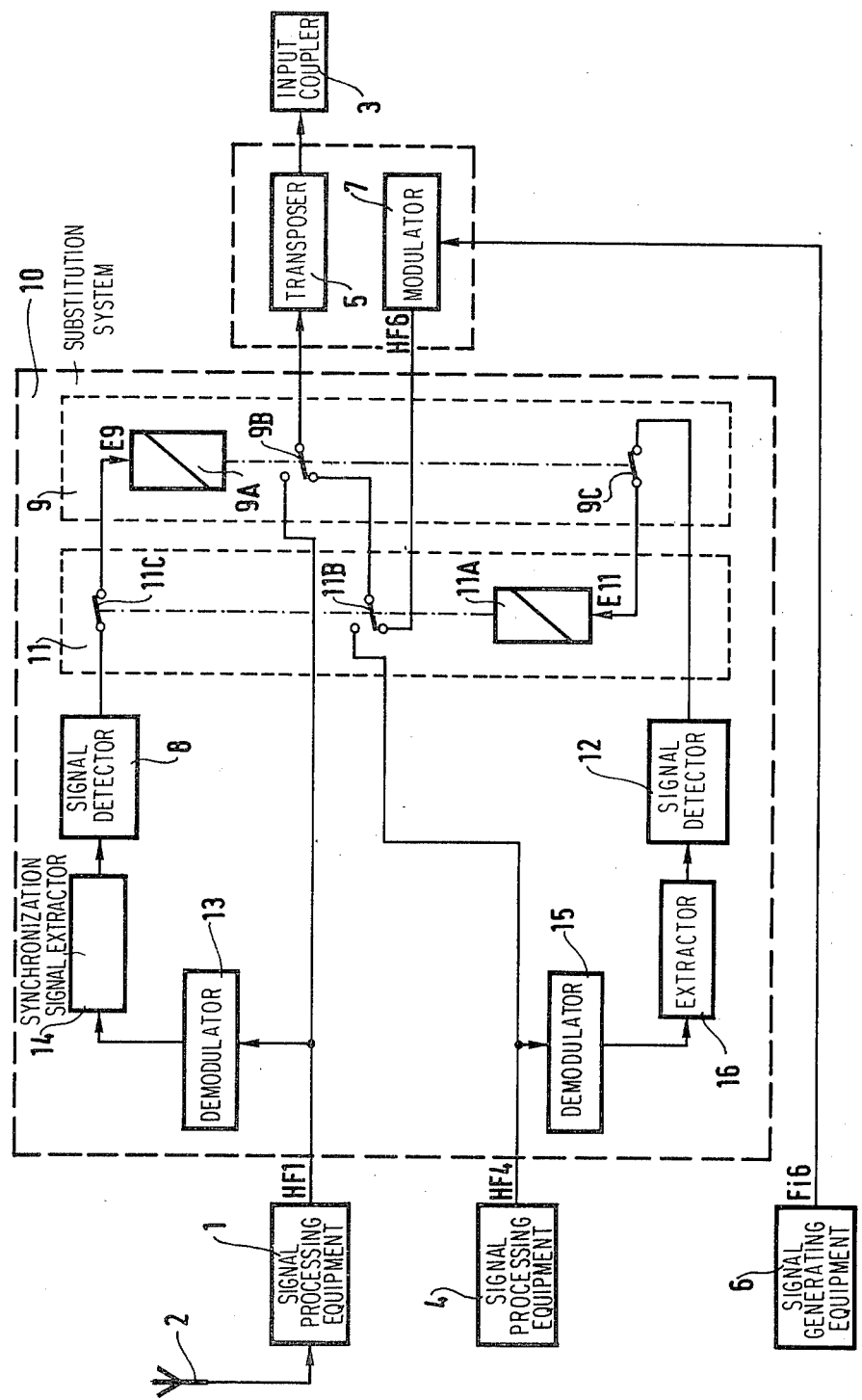

SYSTEM FOR AUTOMATICALLY SUBSTITUTING TELEVISION SIGNALS AT A HEAD STATION FOR A CABLE NETWORK

The present invention relates to a system for automatically substituting transmissions at a station for applying television signals to a cable network.

BACKGROUND

Said network is, for example, a teledistribution network, a closed circuit television network or a community distribution system; it is conventionally provided to transmit audio-visual data coming from various sources, possibly including sources situated outside the control of the station itself.

However, all the audio-visual data transmitted by such a station comes either from signal generating equipments which generally produce only repetitive or identical data or else from signal processing equipments of the receiver or recorder type which provide retransmission immediately or on request of various television broadcasts and programs.

Due to this fact, a station for applying television signals to a cable network is caused to subject the same channel to successive application of recorded programs, broadcast programs and messages which are reproduced, transmitted or generated locally by the processing equipments or generating equipments of said distribution station.

One problem which arises in these stations is how to detect accurately the end of a broadcast coming from a processing equipment in order to start the following broadcast from another processing equipment, in particular when the processing equipment acts as a receiver of a program transmitted by a source over which the distributor station has no control.

Indeed, it is not possible to foresee exactly when a broadcast will end and there may be unforeseeable interruptions which are a nuisance in that they leave users with a blank screen.

To solve this problem, the present invention therefore provides a system for automatically substituting transmissions at a station situated at the head of a cable network.

The invention applies more particularly to cable head television stations of the type equipped with at least one signal processing equipment of the broadcast receiver or recorder type and with at least one television signal generating equipment under the control of the station.

The automatic substitution system includes at least one switch connected by its output to the cable network and by two mutually exclusive inputs to the television signal output of a processing equipment and to the television signal output of a generating equipment so as to be in a position to link the network to one of the other of said equipment and biassed to link the network to the generating equipment in the absence of any specific instruction to the contrary.

The automatic substitution system also includes at least one synchronization detector connected via its input to a television signal output of the processing equipment associated with a switch and via its output to a control input for said switch so that at least the linking of the processing equipment to the cable network is maintained when signals coming from the processing equipment are synchronized.

BRIEF DESCRIPTION OF THE DRAWING

Other characteristics and advantages of the invention will be described with reference to the sole FIGURE of the accompanying drawing which is a block diagram of an automatic substitution system in accordance with the invention associated with the units to which it is connected in the distribution equipment which includes it.

DETAILED DESCRIPTION

Conventionally, television distribution equipment for a cable network includes a plurality of signal processing equipments for receiving television broadcasts over the air and retransmitting them via the cable network after frequency transposition where necessary into an available channel of said network, and also for replaying previously recorded material.

The signal processing arrangement 1 of the single FIGURE is thus suitable for receiving broadcasts via an antenna 2 and for retransmitting them on a channel of a cable network via a conventional input coupler 3 (the network per se is not shown).

The signal processing equipment 4 in the FIGURE is, for example, a video receiver for replaying a recorded broadcast over the network at will.

For signal transmission purposes, the processing equipments 1 and 4 are connected to a transposer 5 which transposes the television signals into the required channel before transmission to the network input coupler 3.

Conventionally, the common feature of the processing equipments 1 and 4 is that they provide first and second complete signals HF1 and HF4 in the HF band.

The distribution equipment referred to hereinabove also includes at least one television signal generating equipment 6.

Said generating equipment 6 is of a conventional type and is designed to produce fixed information such as patterns, call signs or titles or short messages which are often repetitive. Conventionally but not necessarily, said generating equipment 6 produces signals in the intermediate frequency range and it feeds a modulator 7 which produces HF television signals referenced HF6 drawn from intermediate frequency signals Fi6.

A substitution system 10 is inserted between the transposer 5 and the processing equipments 1, 4, together with the generating equipment 6. The substitution system 10 includes a synchronization signal detector 8 which is connected to the HF1 signal output of the processing equipment 1 and which is arranged to produce a continuous signal for detecting synchronisation signals in the HF1 signals.

In practice, the synchronisation signal detector 8 is connected to the HF1 signal output of the processing equipment 1 via a demodulator 13 and a synchronisation signal extractor 14 of conventional types for television signals.

The synchronisation signal detector 8 is constituted, for example, by means of an oscillator circuit centred on the synchronisation pulse frequency 15625 Hz so as to feed a conventional circuit such as an integrator which is suitable for providing a DC control signal for controlling the voltage or the current when there are synchronisation signals included in the signals transmitted by the processing equipment 1.

The synchronisation signal detector 8 is connected to the control input E9 of a switch 9 here illustrated in the form of an electromagnetic relay for clearness' sake in the description and shown in consequence with a control winding 9R. Said switch 9 provides for the HF1 signal output to be linked to the input of the transposer 5 by a unit 9B when it is actuated, e.g. when synchronisation signals are included with the HF1 signal. As soon as the processing equipment 1 no longer transmits a synchronisation signal, i.e. when the remote transmitter ceases transmitting or at least when said processing equipment stops receiving, the switch 9 breaks the link between the processing equipment 1 and the transposer 5, which link was provided by unit 9B, and connects the generating equipment 6 to the transposer 5 so as to ensure that the signals HF6 are sent in the channel occupied up till then by the signals HF1. With this aim in view, the generating equipment 6 operates permanently or quasi-permanently so as to be able to take over without delay.

In the single FIGURE, this is symbolized by illustrating the unit 9B as a single pole change over spring set which provides a first link when it is in the rest position and a second link when it is in the working position, it being understood that the switch 9 is in fact formed by electronic logic components readily designable by the person skilled in the art providing he ensures mutual exclusion of the inputs made available by the relay illustrated.

Generally it is required that one broadcast should follow another, so provision is made for a second switch 11 of the relay type to be inserted to control the link between the processing equipment 4 and the coupler 3.

Said second switch 11 is controlled by a second synchronisation signal detector 12 identical to the first, the input of said signal detector being connected to the output of signals HF4 from the processing equipment 4 via a demodulator 15 and an extractor 16 which are identical to items 13 and 14 and the output of said signal detector is connected to the control input E11 of the switch 11, shown here as having a control winding 11A.

The operation of the substitution system with two switches 9 and 11 is almost the same as that of the substitution system having only one switch 9.

However, in the example illustrated, the unit 11B symbolised by a single pole change over spring set links the HF4 output from the processing equipment 4 to the transposer 5 via the unit 9B when the latter is not switched on. Likewise, the generating equipment 6 is linked to the transposer 5 only if both of the units 9B and 11B are at rest. Therefore, this allows the signals HF4 to be substituted automatically for the signals HF1 at the end of reception by the processing equipment 1 from the moment when the processing equipment 4 is actuated. Further, in the case of lack of synchronisation signals at the outputs of the processing equipments 1 and 4, the generating equipment 6 maintains the signals HF6 as before.

Of course, numerous variants can be devised to increase operating security; in particular switches 9 and 11 may include units 9C and 11C illustrated here as rest contacts and designed to prevent untimely cutting of the links between one processing equipment and the transposer 5 when operation of the other processing equipment is started and said other processing equipment begins to produce signals. This would be a drawback in the example given if operation of the processing equipment 1 were to begin after the processing equipment 4 begins to operate since there would be a danger of one transmission cutting out another.

Of course, in a general way, it is preferable to use switches formed by logic electronic circuits which are not described here since numerous equivalent variants thereof are possible, the choice being determined by questions of operating methods which are not related to the invention.

I claim:

1. A system for automatically substituting transmissions at a station for applying television signals to a cable network, said station being equipped with at least one signal processing equipment of the broadcast receiver type or of the recorder type over which the distribution station has no control and having at least one television signal generating equipment controlled by the station, said substitution system including:
   at least one switch having its output connected to the cable network and means for connecting two mutually exclusive inputs to the cable network and means for connecting two mutually exclusive inputs to the television signal output of a processing equipment and to the television signal output of a generating equipment so as to be in a position to link the network to one or the other of said equipment and biassed to link the network to the generating equipment in the absence of any specific instruction to the contrary;
   at least one synchronizing signal detector having its input connected to a television signal output of the processing equipment and means for connecting its output to a control input of said switch to apply an instruction to the switch to link the generating equipment to the cable network whenever there is no video synchronization signal coming from the processing equipment.

2. A system according to claim 1 for a station equipped with at least two signal processing equipments at least one of which receives signals from a source over which the distribution station has no control, wherein the system includes a synchronizing signal detector per processing equipment and a set of switches having a common output to the cable network and at least three mutually exclusive inputs connected respectively to the television signal output of each processing equipment and of the generating equipment, and arranged to link the cable network to the generating equipment whenever a synchronising signal is not detected in any of the processing equipments.

* * * * *